United States Patent
Ishida et al.

[11] Patent Number: 5,192,456
[45] Date of Patent: Mar. 9, 1993

[54] APPARATUS FOR TREATING ACTIVATED SLUDGE AND METHOD OF CLEANING IT

[75] Inventors: Hiroshi Ishida, Kodaira; Yutaka Yamada, Sakai; Kiyoshi Izumi, Takatsuki; Masashi Moro, Kobe, all of Japan

[73] Assignee: Kubota Corporation, Osaka, Japan

[21] Appl. No.: 846,130

[22] Filed: Mar. 4, 1992

[30] Foreign Application Priority Data

Mar. 7, 1991 [JP] Japan ................................. 3-40334
Aug. 30, 1991 [JP] Japan ................................. 3-219066

[51] Int. Cl.$^5$ ........................ B01D 24/46; C02F 3/00
[52] U.S. Cl. .................................. 210/791; 210/195.2; 210/232; 210/256; 210/295; 210/321.75; 210/323.2; 210/332
[58] Field of Search ............ 210/791, 295, 257.2, 210/321.8, 321.79, 321.88, 321.89, 323.2, 256, 636, 195.2, 232, 459, 416.1, 321.75, 321.84, 332

[56] References Cited

U.S. PATENT DOCUMENTS

| | | | |
|---|---|---|---|
| 1,724,436 | 8/1929 | Swetland | 210/323.2 |
| 3,407,572 | 10/1968 | Tolley | 210/323.2 |
| 3,849,305 | 11/1974 | Manjikian | 210/257.2 |
| 4,749,654 | 6/1988 | Karrer et al. | 210/323.2 |
| 4,832,841 | 5/1989 | Gutman et al. | 210/321.89 |

FOREIGN PATENT DOCUMENTS

| | | | |
|---|---|---|---|
| 322753 | 7/1989 | European Pat. Off. | 210/323.2 |
| 1271 | 1/1979 | Japan | 210/323.2 |
| 3119803 | 5/1988 | Japan | 210/321.75 |
| 1-284317 | 11/1989 | Japan | 210/232.2 |

Primary Examiner—Robert A. Dawson
Assistant Examiner—Ana M. Fortuna
Attorney, Agent, or Firm—Joseph W. Farley

[57] ABSTRACT

An activated sludge treating apparatus for use in treating wastewater, such as gray water and sewage. A plurality of filter membrane modules are vertically arranged in parallel at predetermined intervals within a treating tank. The water to be treated which is stored in the treating tank is separated into solid and liquid by the filter membrane modules, and water that has passed through the filter membrane modules is extracted as treated water. An agitating device is disposed at a level below the filter membrane modules.

10 Claims, 9 Drawing Sheets

APPARATUS FOR TREATING ACTIVATED SLUDGE AND METHOD OF CLEANING IT

FIELD OF THE INVENTION

The present invention relates to an activated sludge treating apparatus for use in treating wastewater, such as gray water and sewage.

BACKGROUND OF THE INVENTION

In known activated sludge treating apparatuses of this type, a plurality of filter membrane modules are vertically arranged in parallel spaced relation within a treating tank, whereby the water to be treated is separated into solid and liquid by being passed through the filter membrane modules so that water that has passed through the filter membrane modules is extracted as treated water. In such known type of apparatus for treatment of activated sludge, a diffused aeration pipe having a plurality of jet holes is disposed at a level below the filter membrane modules in order to prevent deposition and growth of cake and gel layers on the outer surfaces of the filter membrane modules. The air lift action of air blow from the diffused aeration pipe serves to create upward flowing agitation currents of both gas and liquid phases which are utilized to clean the membrane surfaces of the filter membrane modules.

According to such arrangement, it is possible to enhance the cleaning effect of such agitation currents on the filter membrane modules to a certain extent by increasing the amount of air blow from the diffused aeration pipe. However, this involves the following problems. Increased air blow from the diffused aeration pipe may result in excessive aeration with respect to the water being treated and, especially where the water being treated contains ammonia, the pH value of the water will be excessively lowered, the operation of activated sludge treating being thus unfavorably affected.

Another problem is that when the rate of air blow exceeds a specific value, for example, about 1 ($m^3/m^3$·min., where denominator $m^3$ represents cross-sectional area of flow path of gas-liquid phase currents), the air lift action of air blow is decreased due to air-bubble coalescence, which results in decreased energy efficiency. A further problem is that the distance between the diffused aeration pipe and the lower end of the filter membrane modules is so short that air blown from the diffused aeration pipe is unlikely to be uniformly dispersed, which fact will not only tend to decrease the air lift effect of air blow but may tend to create some dead space in filter membrane modules which will remain isolated from gas-liquid phase current flow. As a consequence, cake layers or the like will deposit and grow on such portion of filter membrane modules, thus lowering the flux of the filter membrane modules.

SUMMARY OF THE INVENTION

The present invention is directed to overcoming the foregoing problems, and accordingly it is a primary object of the invention to provide a membrane-separation type activated sludge treating apparatus which eliminates the possibility of any dead space being created in filter membrane modules, is well adapted for uniform cleaning of the entire membrane surfaces of filter membrane modules such that cake layers or the like can be positively prevented from depositing and growing on the membrane surfaces, and which involves less power requirement.

In order to accomplish this object, according to the invention there is provided an activated sludge treating apparatus comprising:

a treating tank in which water to be treated is stored;

a plurality of filter membrane modules vertically arranged in spaced relation within the treating tank for separating said water to be treated into solid and liquid by passing the water therethrough, thereby to extract treated water; and means disposed at a level below said filter membrane modules for agitating said water to be treated.

According to such arrangement, the entire membrane surface of each filter membrane module can be uniformly and positively cleaned by agitation currents created by the agitating means. Therefore, even when the magnitude of air blow from an air blowing pipe or the like is to be adjusted according to the B O D concentration of the water to be treated, the entire membrane surface of each filter membrane module can be uniformly and positively cleaned without being influenced by the rate and velocity of air blow.

DESCRIPTION OF THE PREFERRED EMBODIMENTS

Figure 1:
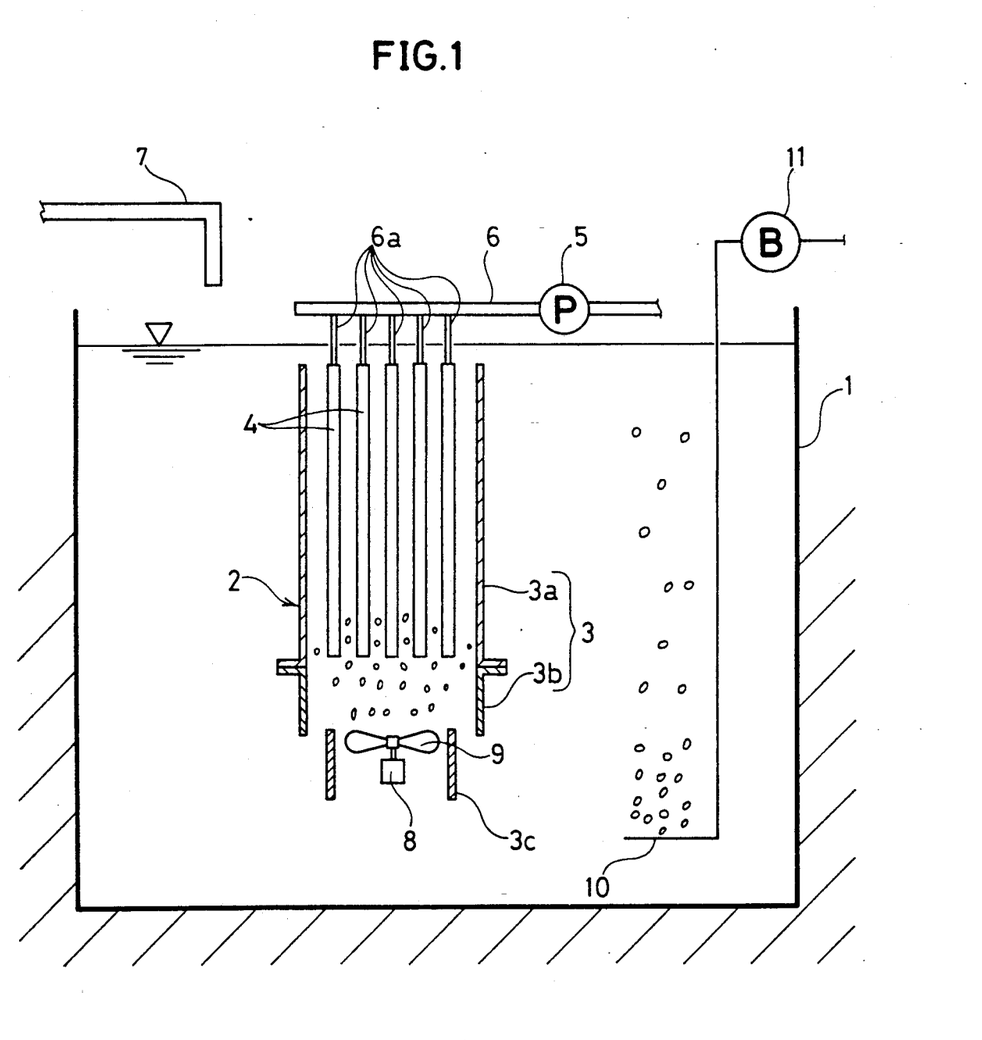
FIG. 1 is a general view in section of an activated sludge treating apparatus representing a first embodiment of the present invention.

FIG. 1 illustrates the first embodiment of the invention. A plurality of filter units 2 are arranged in a treating tank 1. Each filter unit 2 includes a cylindrical casing 3 which is is open at its top and bottom portions, and a plurality of filter membrane modules 4 of plate shape which are vertically arranged in equispaced relation within the casing 3. The casing 3 is of a vertically splitable, two-part construction such that it has first and second casing members 3a, 3b. Filter membrane modules 4 are arranged in the first casing member 3a, and a smaller casing member 3c of cylindrical configuration is provided in the second casing member 3b.

Each filter membrane module 4 is removably disposed in first casing member 3a so that it may be drawn upward for removal. Therefore, filter membrane modules 4 may be removed upward one by one for being individually cleaned and/or replaced. It is possible to separate first casing member 3a or the upper casing member from second casing member 3a or the lower casing member, thereby to remove the first casing member 3a from the treating tank 1 with the plurality of filter membrane modules 4 as attached to the first casing member 3a, so that the filter membrane modules 4 may be individually cleaned and/or replaced. Each filter membrane module 4 is connected at its upper end via a branch pipe 6a to a suction pipe 6 which is fitted with a suction pump 5 at a suitable location. A wastewater supply pipe 7 for feeding wastewater into the treating tank 1 is open at a location above the treating tank 1.

An agitating element 9 having a drive motor 8 is disposed within the smaller casing 3c which is positioned below the filter membrane modules 4. Provided within the treating tank 1 is an air-blowing pipe 10 which extends from the top side of the tank 1 to the bottom side of the tank 1; and a blower 11 is disposed on the proximal end side of the air blowing pipe 10 at a location outside the tank 1.

According to the above described arrangement, wastewater, such as gray water and sewage, which is introduced from the wastewater supply pipe 7 into the treating tank 1, is mixed with activated sludge present in the tank 1 for being treated therein. The water being treated is exposed to air blown by the blower 11 through a plurality of orifices at the tip of the air blowing pipe 10 and is digested by activated sludge.

The water being treated is sucked by the suction pump 5 through filter membrane modules 4 and the suction pipe 6, being separated into solid and liquid as it passes through the filter membrane modules 4, and that part of the water which has passed through the filter membrane modules 4 is extracted as treated water.

Agitation currents created by the agitating element 9 are allowed to flow upward between adjacent filter membrane modules 4 and along membrane surfaces. Such agitation current provides positive cleaning of the entire membrane surface of each filter membrane module 4.

Even when the magnitude of air blow from the air blowing pipe 10 is adjusted according to the B O D concentration of the water to be treated, the entire membrane surface of each filter membrane module 4 can be uniformly and positively cleaned by the agitating action of the agitating element 9 without being influenced by the rate of air blow and jet velocity thereof.

Air bubbles blown from the air blowing pipe 10 are divided into fine bubbles by the agitating action of the agitating element 9. This results in improved efficiency of dissolution of the oxygen content of air bubbles into the water being treated, so that improved biochemical treatment effect can be achieved. In addition, fine air bubbles serve to produce further turbulence effect and inhibit development of vibrations. Thus, after all, water treatment in the treating tank 1 can be satisfactorily accomplished while filter membrane modules 4 are allowed to retain their serviceability for a longer period.

Figure 2:
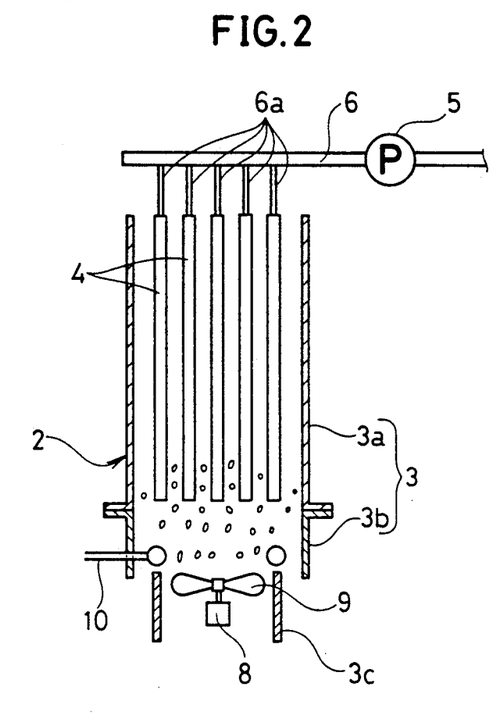
FIG. 2 is a front view showing an essential part of an activated sludge treating apparatus representing a second embodiment of the invention.
Figure 3:
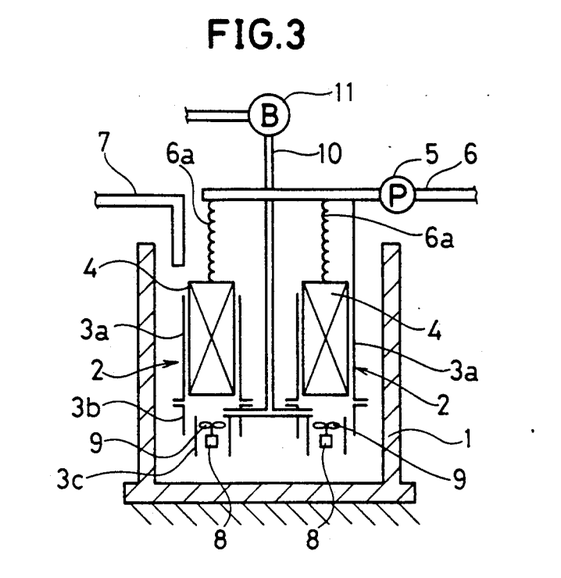
FIG. 3 is a side view of the treating apparatus in FIG. 2.

FIGS. 2 and 3 illustrate the second embodiment of the invention. As shown, a plurality of filter units 2 are arranged within the treating tank 1. An air blowing pipe 10 is led into second casing member 3b to open therein.

According to such arrangement, although the distance between the level at which the air blowing pipe is open and the lower end of first casing member 3a is relatively small, air blown from the open end of the air blowing pipe 10 is caught up into agitation currents created by agitating element 9 in the second casing member 3b, so that the air is uniformly dispersed in the form of fine air bubbles (of about 3-4 mm in diameter) over a wide area. Such fine air bubbles flow upward between adjacent filter membrane modules 4 and along the membrane surfaces thereof. As a result, upward flowing agitation currents of two phases, gas and liquid, are created, whereby entire membrane surfaces of individual filter membrane modules 4 can be positively cleaned.

Although, in this embodiment, each filter unit 2 comprises a plurality of filter membrane modules 4 arranged in a casing 3 and is disposed in the treating tank 1, it is possible to arrange filter membrane modules directly within the treating tank 1 without using casing 3. In that case, filter plates of outermost filter membrane modules 4 may be utilized as a casing. It is also noted that although, in the embodiment, air blowing pipe 10 is open within second casing member 3b, it is possible to arrange that the air blowing pipe 10 communicates with the interior of smaller casing member 3c.

Figure 4:
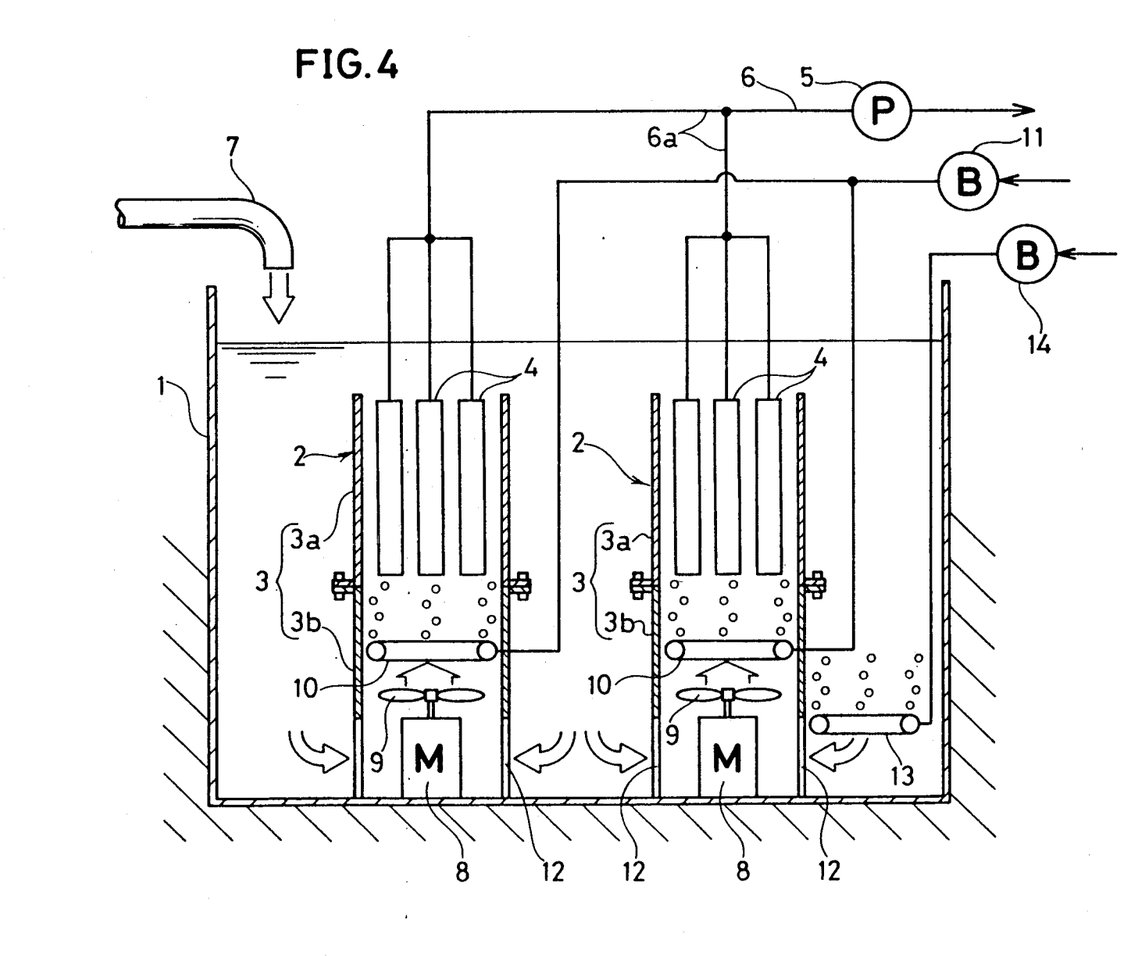
FIG. 4 is a general view in section of an activated sludge treating apparatus representing a third embodiment of the invention.

FIG. 4 illustrates the third embodiment wherein, as is the case with the FIG. 3 embodiment, a plurality of filter units 2, or casings 3, are arranged in the treating tank 1, each casing 3 having a plurality of filter membrane modules 4 arranged therein. No smaller casing member 3c is provided, but instead second casing member 3b is extended to the bottom of the treating tank 1, there being disposed a drive motor 8 and an agitating element 9 in the second casing member 3b. Shown at 12 is an inlet port for entry into the casing 3 of water to be treated.

In the treating tank 1, an air blowing pipe 10 is provided within casing 3 as in the FIG. 2 embodiment and, in addition, another air blowing pipe 13 is disposed outside the casing 3. Designated by 14 is a blower. Therefore, in case that the air supply from the air blowing pipe 10 in the casing 3 falls short of the oxygen requirement for biological treatment, such amount of air as will match the B O D concentration of the water being treated is blown from said other air blowing pipe 11.

Figure 5:
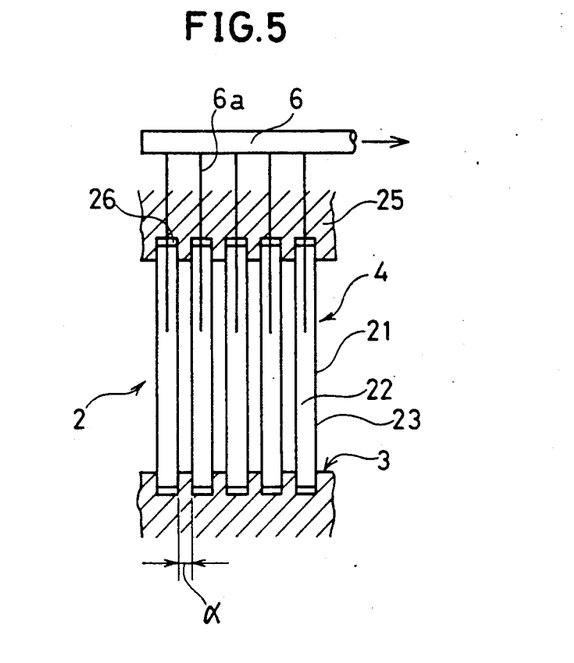
FIG. 5 is a plan view showing the arrangement of filter membrane modules in an activated sludge treating apparatus representing a fourth embodiment of the invention.
Figure 6:
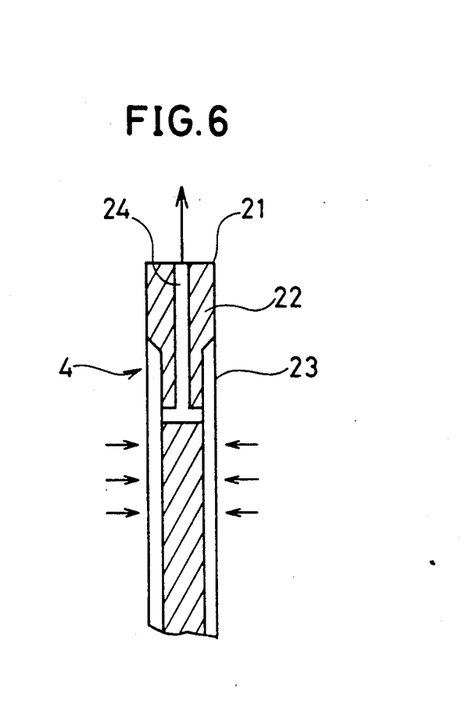
FIG. 6 is a sectional view showing one of the filter membrane modules in FIG. 5.

FIGS. 5 and 6 illustrate the fourth embodiment of the invention and, in particular, a specific form of connection of filter membrane modules 4 with casing 3 in each filter unit 2. In these figures, an element 21 which constitutes a filter membrane module 4 comprises a filter plate 22 covered on both sides with filter membranes 23. The filter plate 22 is formed in its interior with a treated-water flow passage 24 which is open at both sides of the filter plate 22.

In order to permit a plurality of filter membrane modules 4 to be integrally held in position, it is arranged that on the inner surface of a frame member 25 of each casing 3 which is of rectangular configuration are formed guide grooves 26 for receiving the filter membrane modules 4, at predetermined intervals α in the direction in which the filter membrane modules 4 are arranged in parallel, so that individual filter membrane modules 4 are held in corresponding guide grooves 26. The predetermined interval α is set to a distance of more than 6 mm but less than 10 mm.

According to such arrangement, as is the case with the foregoing embodiments, the water being treated is allowed to flow as an upward stream under the air lift action of air jet from the air blowing pipe while being subjected to the agitation effect of the agitating element, the water being thus allowed to flow into gaps α between individual filter membrane modules 4. Each filter membrane module 4 sucks water-being-treated through its filter membrane 23 under negative pressure from suction pipe 6.

Particulate substances present in water being treated are prevented by filter membrane 23 from passing therethrough, with the result that they deposit in cake form on the surface of the filter membrane 23, whereas treated water, or water that has passed through the filter membrane 23, is received into the suction pipe 6 after its passage through treated-water flow passage 24 and branch pipe 6a. Cake that has deposited on the surface of filter membrane 23 is separated from the membrane surface by upward agitation current of water being treated.

In this case, if the gap α between adjacent filter membranes 23 in each set of filter membrane modules 4 arranged in parallel spaced relation is less than 6 mm, the flow path defined by the gap α is so narrow that cake jamming is easily caused due to cake layer growth on the membrane surface and separated cake mass, the flow path being thereby blocked. If the gap α is more than 10 mm, the effect of shearing force exerted on cake layer by a combination of upward current flow velocity and air bubbles may be reduced.

Therefore, by setting gap α to a level of more than 6 mm but less than 10 mm it is possible to eliminate the possibility of cake jamming in the inter-membrane flow path defined by gap α and to permit cake layers to be effectively acted upon by both air bubbles and the flow velocity of upward current flowing through the flow passage between adjacent membrane surfaces, so that the energy requirement for membrane surface cleaning may be reasonably reduced.

As stated above, a plurality of filter membrane modules 4 are arranged in position by being fitted in corresponding guide grooves 26 formed in frame member 25, whereby the filter membrane modules 4 are integrally held in the frame member 25. Therefore, for the purpose of maintenance of filter membrane modules 4, any filter membrane module 4 which requires maintenance can be removed simply by pulling it off the frame member 25 while other filter membrane modules 4 are held in position as they are.

According to the above described arrangement, the entire membrane surface of each filter membrane module 4 can be positively and uniformly cleaned by an agitation current produced by agitation means. Therefore, even when the magnitude of air blow from an air blowing pipe or the like is to be adjusted correspondingly to the B O D concentration of the water being treated, filter membrane modules can be uniformly and accurately cleaned with respect to their entire membrane surfaces, independent of the rate and velocity of air blow.

Figure 7:
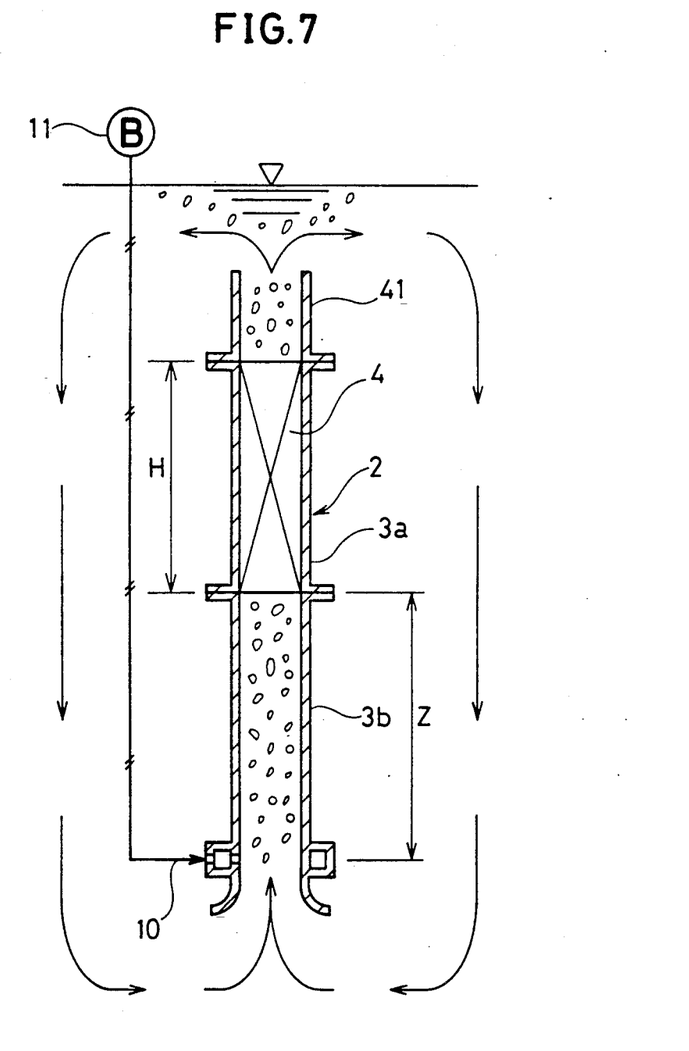
FIG. 7 is a sectional view showing an essential part of a fifth embodiment of the invention.

FIG. 7 is a sectional view of essential part of the fifth embodiment of the invention. A plurality of filter units 2 are arranged within the treating tank 1, each filter unit 2 comprising a top and bottom-opened cylindrical casing 3, and a plurality of filter membrane modules 4 of plate-like shape which are vertically arranged in equispaced relation within the casing 3. The casing 3 is of a vertically splittable, two-part construction having first and second casing members 3a, 3b. A discharge pipe 41 is mounted at the top end of the first casing member 3a or upper casing member. Character H represents the length of the first casing member 3a. Length Z of the second casing member 3b is dimensioned substantially longer than that of the comparable casing member in the earlier described first and second embodiments. Air blow pipe 10 is open at the level of the base of a flared lower end opening of the second casing member 3b, which flared opening is intended to lessen the fluid resistance involved.

According to such arrangement, wherein the length of the second casing member 3b is dimensioned sufficiently large, air blown from the opening at the tip of the air blow pipe 10 will be dispersed in the form of fine air bubbles (of 3-4 mm in diameter) over the entire cross-sectional area of the second casing member 3b without using such an agitating element as is employed in the earlier described first and second embodiments. In order to insure uniform dispersion of air, length Z should preferably be at least 500 mm.

It is not necessarily the case that the greater the length Z of second casing member 3b, the better. Where the FIG. 7 arrangement is employed in treating activated sludge of sewage or the like, the air blow requirement may be of the order of 0.5-1.0 ($m^3/m^3$·min) per unit sectional area of second casing member 3b (which value is extremely large as compared with that in the case of ordinary activated sludge treatment), but it must be noted in this conjunction that if the length Z of second casing member 3b is set excessively large, coalescence of air bubbles may result and the air lift effect of air bubbles will be decreased. More specifically, in the case of the arrangement employed in the first or second embodiment, even if the length Z of second casing member 3b is relatively short, air bubbles can be uniformly dispersed and made finer because of the provision of the agitating element, but whereas in the case of the FIG. 7 arrangement in which no agitating element is provided, if length Z is too large, coalescence of air bubbles will occur in the process of upward flow of air bubbles within the second casing member 3b. If air bubble diameter is larger than 10 mm, air bubbles are no longer allowed to pass the gap between adjacent filter membrane modules 4 and hence the air lift effect of air bubbles will be lowered. This in turn will cause drift, which may lead to flux degradation due to cake layer deposition. Therefore, the length Z of second casing member 3b should preferably be not more than 2 m at most.

The power requirement for operation of the apparatus is 1.2 $kWh/m^3$ per unit amount of treated water (amount of water that has passed through membrane) in the case of the foregoing first, second and third embodiments, whereas in the case of the fifth embodiment shown in FIG. 7, the power requirement may be reduced to 0.45 $kWh/m^3$ under proper design conditions such that H=1 m, Z=1 m, and bore diameter of both first and second casings is 0.3 m.

Figure 8:
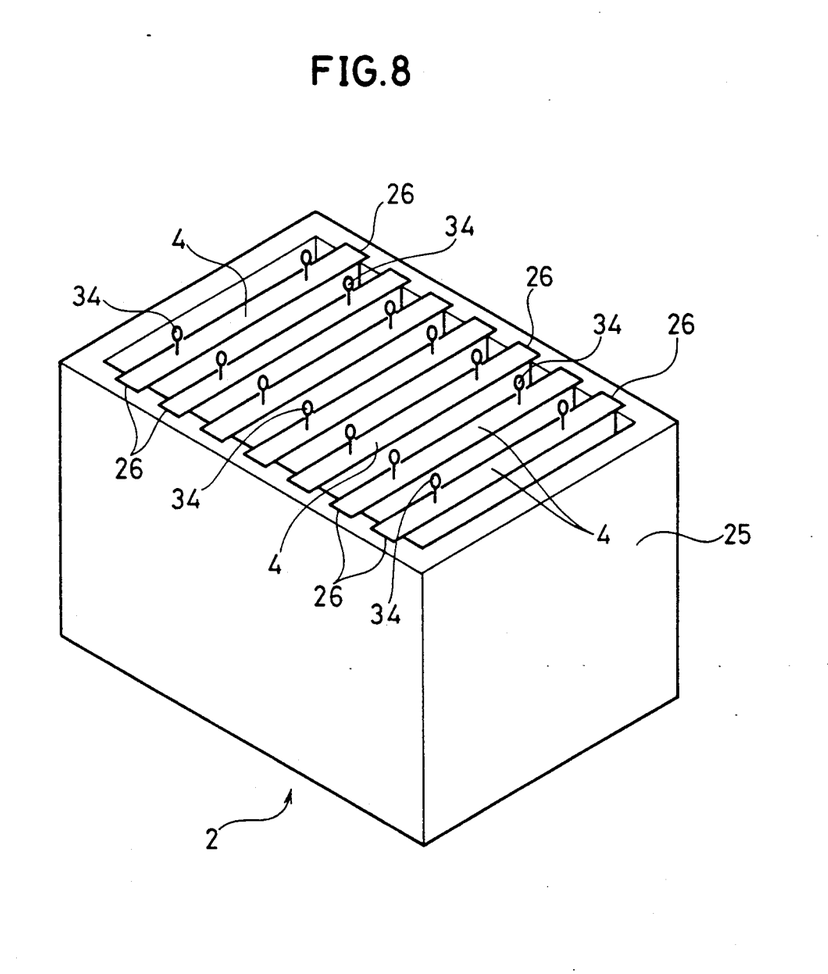
FIG. 8 is a perspective view showing an essential part of an activated sludge treating apparatus representing a sixth embodiment of the invention.

FIGS. 8 through 12 illustrate the sixth embodiment of the invention. In FIG. 8, filter membrane modules 4 are individually fitted in guide grooves 26 formed in frame member 25 in same way as those shown in FIGS. 5 and 6. At opposite end portions of the top of each filter membrane module 4 there are provided a pair of hooks 34 for lifting the filter membrane module 4.

Figure 9:
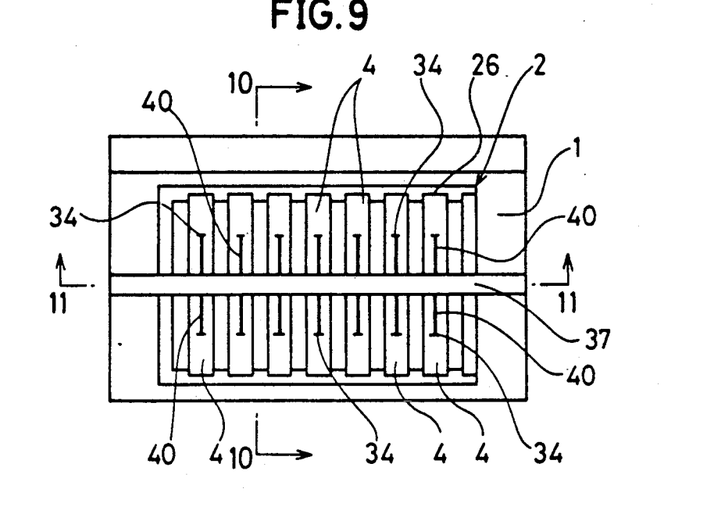
FIG. 9 is a plan view showing filter membrane modules in the FIG. 8 apparatus as supported in suspension.
Figure 10:
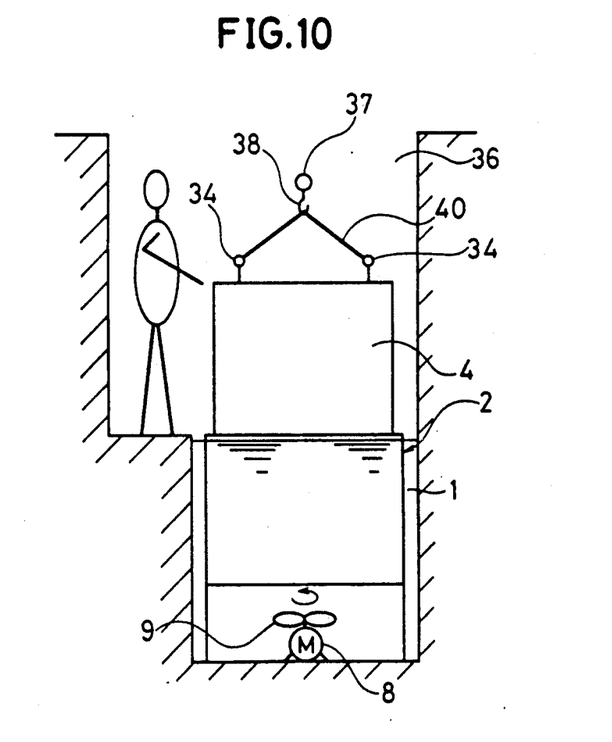
FIG. 10 is a section taken along line 10—10 in FIG. 9.
Figure 11:
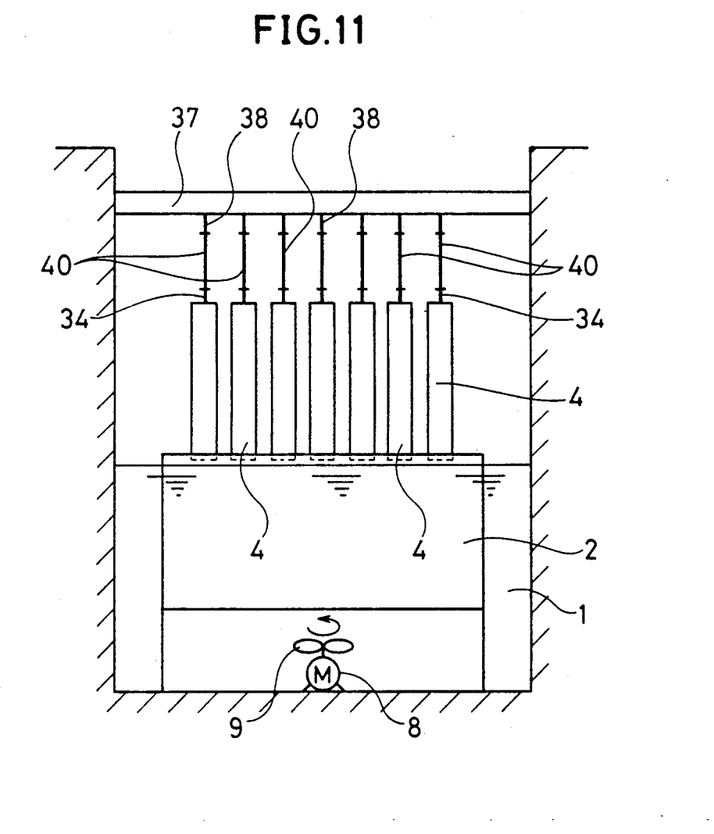
FIG. 11 is a section taken along line 11—11 in FIG. 9.

Filter membrane modules 4 are submerged in the trating tank 1 as shown in FIGS. 9 to 11. An operator's cabin 36 is provided above the treating tank 1, and a hanger support bar 37 is disposed above the operator's cabin 36 and along a center line extending between opposite top ends of inner walls of the cabin. The hanger support bar 37 is fitted with hooks 38 which are positioned at suitable intervals, so that filter membrane modules 4 lifted from corresponding guide grooves 26 can be suspended from the hooks.

Nextly, method of cleaning the filter membrane modules 4 will be explained. When filter membrane modules 4, as submerged in the treating tank 1, have been engaged in separating water-being-treated into activated sludge and treated water for a given period of time (three to four months), cake layers of activated sludge are formed on the membrane surface of each filter membrane module 4 despite the effect of upward flow currents created by agitating element 9 and the like. Therefore, in order to remove such cake layers, initially the water being treated is partially removed from the treating tank 1 in which the level of the water being treated is about 20-50 cm above the upper ends of filter membrane modules 4 during usual operation, until the upper ends of the filter membrane modules 4 have become visible. Hooks 34 of the filter membrane modules 4 which have become visible as a result of this partial removal are caught up by wire 40 and the filter membrane modules 4 are then lifted along the guide grooves 26. Then, while holding the filter membrane modules 4 in such condition that their lower ends remain engaged about 10 to 20 mm with the guide grooves 26, lifting operation with respect to the filter membrane modules 4 is stopped, and wire 40 is caused to be engaged by hooks 38 on the hanger support bar 37.

In this manner, filter membrane modules 4 are supported at their upper ends in suspension from the hanger support bar 37 and are held in engagement at their lower ends with guide grooves 26; therefore, filter membrane modules 4 are held in suspension in unshakably secured condition. While being held in such condition, filter membranes of the modules 4 are mechanically or manually cleaned, which insures easy cleaning. As such, there is no possibility of any other facility getting wet or getting spoiled by waste water from cleaning operation. Further, the fact that less movement of filter membrane elements is required in cleaning operation provides an advantage that membranes are less liable to damage.

For the purpose of cleaning operation, a nozzle for jetting cleaning water (not shown) may be attached to the hanger support bar 37 or disposed adjacent the support bar 37 in order to wash away cake layers of activated sludge with high pressure washing water as a preliminary step of cleaning.

Although cleaning operation may be carried out by lifting all filter membrane modules 4 at one time, the fact that filter membrane modules 4 are fitted in guide grooves 2 at intervals of 6 to 10 mm as earlier described permits three or four modules to be lifted each time for being supported in suspension from the hanger support bar 37, in which case the filter membrane modules 4 so supported may be spaced from each other at a distance of 50 to 100 mm; this greatly facilitates machine-cleaning operation.

Figure 12:
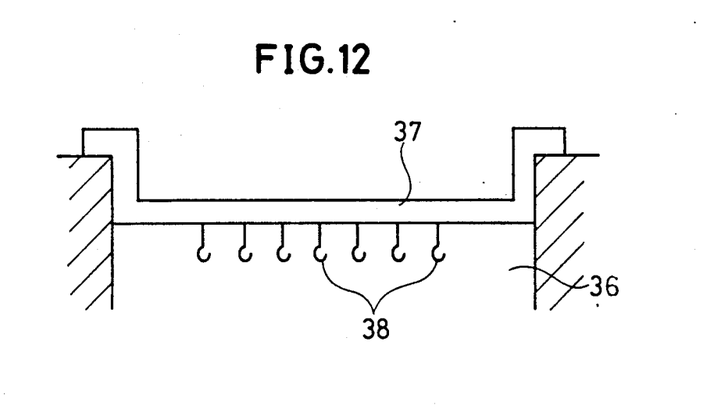
FIG. 12 is a schematic view showing another form of the hanger support bar for supporting filter membrane modules in suspension as seen in FIG. 8.

The hanger support bar 37 shown in FIG. 11 is fixed to inner walls of the operator's cabin, but as an alternative it may be of such removable type as shown in FIG. 12 so that it may not interfere with usual operation of the treating tank 1 other than cleaning operation.

Figures 13, 14:
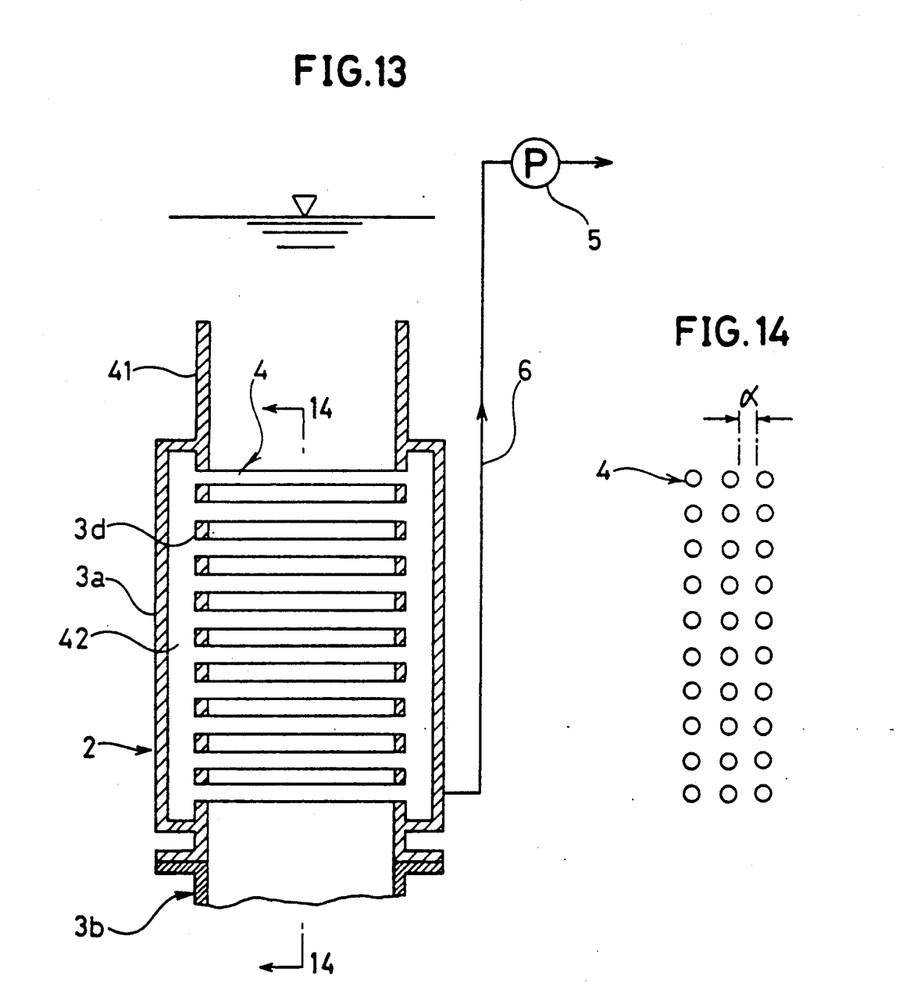
FIG. 13 is another form of filter membrane module arrangement.
FIG. 14 is a section taken along line 14—14 in FIG. 13.

FIGS. 13 and 14 illustrate another example of filter membrane module arrangement. In this embodiment, filter membrane modules 4 are of a horizontal tubular configuration and are arranged in plurality both vertically and horizontally at intervals $\alpha$ of 6 to 10 mm. Shown by 3d is a tubular plate. A space 42 is defined between casing member 3a and such tubular plate 3d, and a suction pipe 6 is in communication with the space 42.

What is claimed is:

1. An activated sludge treating apparatus comprising:
a treating tank in which water to be treated is stored;
a plurality of filter membrane modules vertically arranged in spaced relation within the treating tank for separating said water to be treated into solid and liquid by passing the water therethrough, thereby to extract treated water;
an agitating element disposed at a level below said filter membrane modules for creating upward flow currents;
a first casing member accommodating said filter membrane modules;
a second, vertically extending cylindrical casing member connected to a lower end of said first casing member and having a length of more than 500 mm but less than 2000 mm;
said filter membrane modules and said agitating element being accommodated in said casing members to form a filter unit; and
a plurality of said filter units are arranged in said treating tank.

2. An activated sludge treating apparatus as set forth in claim 1, further comprising means for blowing air into the treating tank.

3. An activated sludge treating apparatus as set forth in claim 2, wherein said air blowing means is in communication with an interior of said casing members.

4. An activated sludge treating apparatus as set forth in claim 2 wherein said air blowing means is in communication with the interior of said second casing member at a level below said filter membrane modules and above said agitating element.

5. An activated sludge treating apparatus as set forth in claim 3, further comprising another air blowing means for blowing air into the treating tank at a location outside said casing members.

6. An activated sludge treating apparatus as set forth in claim 1, wherein each of said filter membrane modules are a plate filters, said apparatus further comprising:
a frame member for housing said plate filter membrane modules; and
a plurality of guide grooves formed in said frame member for causing said plate filter membrane modules to be housed in said frame member and to be arranged parallel at predetermined intervals.

7. An activated sludge treating apparatus as set forth in claim 6, wherein said predetermined interval is more than 6 mm but less than 10 mm.

8. An apparatus for waste water treatment comprising:
a treating tank in which water to be treated is stored;

a plurality of filter membrane modules vertically arranged in spaced relation within the treating tank for separating said water to be treated into solid and liquid by passing the water therethrough, thereby to extract treated water;

a first casing member accommodating said filter membrane modules;

a second, vertically extending cylindrical casing member connected to a lower end of said first casing member and having a length of more than 500 mm but less than 2000 mm;

means for blowing air into said treating tank;

said filter membrane modules, said first casing member and said second casing member constituting a filter unit; and a plurality of said filter units being arranged in said treating tank.

9. Waste water treatment apparatus as set forth in claim 8 wherein said air blowing means is in communication with said second casing member at a level below said filter membrane modules.

10. A method of cleaning the filter membrane modules in an apparatus for treating sewage sludge, said apparatus comprising:

a treating tank in which water to be treated is stored;

a plurality of filter membrane modules vertically arranged in spaced relation within the treating tank for separating said water to be treated into solid and liquid by passing the water therethrough, thereby to extract treated water; an agitating element disposed at a level below said filter membrane modules for creating upward flow currents;

a first casing member accommodating said filter membrane modules;

a second, vertically extending cylindrical casing member connected to a lower end of said first casing member and having a length of more than 500 mm but less than 2000 mm;

said filter membrane modules and said agitating element being accommodated in said casing members to form a filter unit; and a plurality of said filter units are arranged in said treating tank;

wherein said filter membrane modules are plate filters; and the apparatus further comprising:

a frame member for housing said plate filter membrane modules; and a plurality of guide grooves formed in said frame member for causing said plate filter membrane modules to be housed in said frame member and to be arranged at predetermined intervals;

wherein the method comprises:

lifting the filter membrane modules along the guide grooves;

stopping said lifting operation while holding the filter membrane modules in such condition that their lower ends are in engagement with the guide grooves, then supporting the filter membrane modules in suspension; and cleaning by washing the filter membrane modules thus lifted and supported in suspension.

* * * * *

UNITED STATES PATENT AND TRADEMARK OFFICE
CERTIFICATE OF CORRECTION

PATENT NO. : 5,192,456
DATED : March 9, 1993
INVENTOR(S) : Hiroshi Ishida et al.

It is certified that error appears in the above-identified patent and that said Letters Patent is hereby corrected as shown below:

Column 4, line 51, "11" should read --13--.

Signed and Sealed this

Fourth Day of January, 1994

*Attest:*

BRUCE LEHMAN

*Attesting Officer*     Commissioner of Patents and Trademarks